(12) United States Patent
Stafford (10) Patent No.: US 12,534,260 B1
(45) Date of Patent: Jan. 27, 2026

(54) APPARATUS FOR RECYCLING PLASTIC

(71) Applicant: Andrew Matthew Stafford, Saunderstown, RI (US)

(72) Inventor: Andrew Matthew Stafford, Saunderstown, RI (US)

( * ) Notice: Subject to any disclaimer, the term of this patent is extended or adjusted under 35 U.S.C. 154(b) by 0 days.

(21) Appl. No.: 18/481,629

(22) Filed: Oct. 5, 2023

Related U.S. Application Data (60) Provisional application No. 63/413,283, filed on Oct. 5, 2022.

(51) Int. Cl.
| | |
|---|---|
| *B65B 63/08* | (2006.01) |
| *B65B 3/06* | (2006.01) |
| *B65B 7/28* | (2006.01) |
| *B65B 43/54* | (2006.01) |
| *B65B 57/00* | (2006.01) |

(52) U.S. Cl.
CPC ............... *B65B 63/08* (2013.01); *B65B 3/06* (2013.01); *B65B 7/2864* (2013.01); *B65B 43/54* (2013.01); *B65B 57/00* (2013.01)

(58) Field of Classification Search
CPC ......... B65B 63/08; B65B 3/06; B65B 7/2864; B65B 43/54; B65B 57/00; B65B 7/26; Y02W 30/62
See application file for complete search history.

(56) References Cited

U.S. PATENT DOCUMENTS

| | | | |
|---|---|---|---|
| 4,117,646 A * | 10/1978 | James | B65B 7/2871 |
| | | | 53/488 |
| 5,075,057 A | 12/1991 | Hoed | |
| 5,111,927 A | 5/1992 | Schulze, Jr. | |
| 5,112,554 A * | 5/1992 | Perez | B29C 66/919 |
| | | | 264/262 |
| 5,390,799 A | 2/1995 | Previero | |
| 2007/0149625 A1 | 6/2007 | Lark et al. | |
| 2010/0044481 A1 | 2/2010 | Green | |
| 2020/0172273 A1* | 6/2020 | Bergami | B65B 29/022 |
| 2021/0237914 A1* | 8/2021 | Jonker | B65B 7/28 |

(Continued)

FOREIGN PATENT DOCUMENTS

| | | |
|---|---|---|
| CN | 102172599 B | 7/2013 |
| CN | 205588506 U | 9/2016 |
| CN | 111056190 A | 4/2020 |

*Primary Examiner* — Himchan Song
(74) *Attorney, Agent, or Firm* — John Rizvi; John Rizvi, P.A.—The Patent Professor®

(57) ABSTRACT

An apparatus for recycling plastic includes a plastic melting device and delivery means for application of recycled melted plastic material to a packaging container to seal the container. The plastic melting device comprises a stainless steel housing configured to receive plastic material, at least one heating element disposed in the housing, and a distribution port configured to be selectively closed and opened. The apparatus further comprises a conveyor belt, sensors and a plurality of mechanical arms configured for directing the container through the apparatus. The container may be positioned by the conveyor belt and mechanical arms to receive a quantity of the melted plastic material from the distribution port, and for contact with rollers carried on a mechanical arm for closure of the container. The apparatus may further comprise a cooling means for cooling the recycled product. The apparatus may be powered by an AC or DC power source.

30 Claims, 3 Drawing Sheets

(56) References Cited

U.S. PATENT DOCUMENTS

2022/0048651 A1* 2/2022 de Jong .................... B65B 7/20
2022/0363423 A1* 11/2022 Jonker .................. B65B 61/002
2023/0203349 A1* 6/2023 Yli-Peltola .............. C08J 11/06
                                                                      521/47

* cited by examiner

APPARATUS FOR RECYCLING PLASTIC

CROSS-REFERENCE TO RELATED APPLICATIONS

This application claims the benefit of U.S. Provisional Patent Application Ser. No. 63/413,283 filed on Oct. 5, 2022, which is incorporated by reference herein in its entirety.

FIELD OF THE INVENTION

The present invention relates generally to recycling of plastic materials, and more particularly to a system for melting and recycling plastic to provide a recycled plastic product which may be immediately used as a hot-melt adhesive to seal a packaging container such as a packaging box.

BACKGROUND OF THE INVENTION

There is increased interest in the recycling of many materials. Recycling, an alternative to waste disposal, includes processes for converting discarded or waste materials into a reusable state, or for converting discarded or waste materials into new materials and objects. This may include the processes for restoring properties of materials to an unused state, or for "repurposing" materials for a new use. The recyclability of a material therefore depends on whether the material is capable of being restored or repurposed.

Recycling may reduce waste of useful materials, and reduce consumption of fresh raw materials. Recycling may result in reduction of energy use, and prevention or reduction of environmental pollution, including but not limited to air pollution from waste incineration and land or water pollution from waste landfills.

Notwithstanding the increased attention to recycling, new ways of recycling are needed.

Multipurpose recycling options intended are inefficient. Sorting of various materials must be undertaken before any actual recycling may occur. Often materials collected for recycling end up in a landfill.

Some existing options are directed to home recycling use. Ineffective solutions exist for recycling and compressing plastic waste for the purposes of minimizing space, maximizing manageability and otherwise improving the logistics of recycling plastic bottles. The end result of these solutions may be a flattened plastic product. The flattened plastic products are only compressed in one plane and still demand a substantial space to be stored.

Some options provide cutting, shredding or grinding plastic bottles into plastic confetti. No repurposing of these materials is provided, and these materials will likely end up in a landfill.

Recycling machines configured for recycling plastic are also ineffective. Though some machines may endeavor to provide separation and washing of components, and other machines may endeavor to provide grinding, crushing or compressing to minimize the volume of recyclable material, no recycling is provided. The material must either be transferred to another location for actual recycling to occur, or will likely also end up in a landfill.

Current solutions require sorting and separation of plastic materials require sorting of the plastic materials into different types and grades of such plastics in order to repurpose the plastic materials.

Conventional plastic materials in common use as consumer product containers, such as, for example without limitation, water bottles are ubiquitous. A solution is needed for reducing the volume of consumer plastic and repurposing it in an easy, effective, useful and beneficial manner.

Ideally, it would be extremely useful to be able to recycle plastic materials for repurposing and immediate use. It would further be extremely useful for an apparatus capable of recycling plastic materials for immediate use as a plastic hot melt adhesive.

Accordingly, there is a need for a solution to at least one of the aforementioned problems. For instance, there is an established need for a system which includes an on-site apparatus for recycling plastic materials into a plastic hot-melt adhesive for instantaneous application to a packaging container to seal or close the packaging container.

SUMMARY OF THE INVENTION

The present invention is directed to an environmentally friendly easy to use plastic recycling apparatus for melting and recycling plastic to provide a recycled plastic product which may be immediately used as a hot-melt adhesive. The apparatus may be provided as part of a packaging system configured to seal a packaging container such as a packaging box or a packaging crate, or any other suitable package assembly. The plastic recycling apparatus may be provided at any suitable location, nonlimiting examples of which may include residences, offices, and retail locations at which consumers may package items for shipping (office stores, shipping retail stores, post offices or the like). Consumers may bring their recyclable plastic to such retail locations, and use the recyclable plastic to seal packaging boxes.

The plastic recycling apparatus may provide a melting and recycling apparatus for melting and recycling plastic to produce the recycled plastic product, namely a plastic adhesive. The recycled plastic product may be immediately used to seal packaging containers or boxes.

In a first implementation, the present invention provides an apparatus for recycling plastic. The apparatus comprises a plastic melting device and delivery means for application of recycled melted plastic material to a packaging container or box to seal the container or box. The plastic melting device comprises a stainless steel housing configured to receive plastic material, at least one heating element disposed in the housing, and a distribution port configured to be selectively closed and opened. The apparatus further comprises a conveyor belt, sensors and a plurality of mechanical arms configured for directing the container or box through the apparatus. The container or box may be positioned by the conveyor belt and mechanical arms to receive a quantity of the melted plastic material from the distribution port, and for contact with rollers carried on a mechanical arm for closure of the container or box. The apparatus may further comprise a cooling means for cooling the recycled product after application to the container or box. The apparatus may be powered by an AC or DC power source.

In one aspect, the plastic recycling apparatus may comprise a plastic melting device which comprises a stainless steel housing configured to receive, heat, melt and mix a recyclable plastic material.

In one aspect, the apparatus is constructed and arranged to receive, melt and recycle plastic to provide a recycled plastic product capable of use as a hot melt adhesive which may be used to seal packaging containers such as boxes or the like.

In one aspect, the plastic recycling apparatus may comprise a support structure capable of supporting the elements thereof. The components of the plastic recycling apparatus may be supported by an outer apparatus frame (not shown). The frame may be any suitable frame made of any suitable material.

In one aspect, the support structure may be incorporated into the stainless steel housing of the plastic melting device. The stainless steel housing of the plastic melting device may be constructed and arranged to provide a support frame or structure to support other elements or components of the plastic recycling apparatus.

In one aspect, the stainless steel housing of the plastic melting device may have any suitable shape, such as, for example without limitation, a square or cube shape, or a cylindrical shape.

In one aspect, the stainless steel housing of the plastic melting device may have a housing exterior surface, a housing first outer wall, a housing second inner wall, and a housing interior surface. The housing of the plastic melting device may have a housing interior portion or interior tank configured to receive the recycled plastic material.

In one aspect, the plastic melting device may further comprise at least one heating element disposed in the housing, between the housing first outer wall and the housing second inner wall. The at least one heating element may comprise a plurality of heating elements.

In one aspect, the housing may comprise at least one housing side, a housing base, and a housing interior defined by the at least one housing side and the housing base. In some embodiments, the housing may be cylindrical and may comprise a cylindrical side and a housing base. In other embodiments, the housing may have a square or rectangular cube shape, and may comprise a left housing side, a right housing side, a front housing side, a rear housing side, and a housing base. The housing interior may be defined by the at least one housing side and the housing base.

In one aspect, the housing may comprise a housing exterior surface and a housing interior surface. The housing interior surface may comprise interior surfaces of the at least one housing side and the housing base.

In one aspect, the apparatus comprises a plurality of heating elements, the at least one side and the housing base each having at least one heating element disposed therein.

In one aspect, at least one heating element may be disposed between the housing exterior surface and the housing interior surface. In some embodiments, the at least one housing side wall may comprise a housing outer side wall and the housing inner side wall, with at least one heating element disposed therebetween. In some embodiments, the housing base may comprise a housing base outer wall and a housing base inner wall, with at least one heating element disposed therebetween.

In one aspect, the housing interior may comprise an interior tank configured to receive the recycled plastic material. The housing further comprises an upper housing opening defined by the at least one side wall, configured to receive a quantity of any suitable plastic material for melting and recycling by the apparatus. The plurality of heating elements is configured to melt the plastic material.

In one aspect, the apparatus further comprises a distribution port in fluid communication with and extending downwardly from the housing base for conveying the melted recycled plastic product from the housing. The distribution port may convey the melted recycled plastic produced for application to a packaging box to be sealed thereby. The distribution port may comprise a distribution port lower portion constructed and arranged for use in applying the melted recycled plastic to a packaging container. The apparatus further comprises a stopper configured to selectively open and close the distribution port.

In one aspect, the plastic melting device of the apparatus may further comprise a distribution port in fluid communication with the interior tank of the housing of the plastic melting device. The distribution port is configured to convey the melted recycled plastic material from the housing of the plastic melting device. The distribution port may be selectively opened and closed by a removable stopper. The distribution port may comprise an upper portion connected to the housing, and a lower portion. The lower portion of the distribution port may comprise a delivery tube for delivery of the melted plastic. The melted recycled plastic may be conveyed from the housing through the distribution port and travel through the delivery tube for application of the melted plastic to a packaging container or box to be sealed thereby.

In one aspect, the apparatus may further comprise a conveyor belt for supporting and conveying the packaging container or box to be sealed, and a plurality of sensors to monitor the location of the box as it is conveyed through the apparatus.

In one aspect, the conveyor belt may be bifurcated, and constructed and arranged to split into two directions.

In one aspect, the apparatus may further comprise a plurality of mechanical arms configured to direct movement of elements of the apparatus, or the packaging box. The plurality of mechanical arms may be configured to work in combination with the conveyor belt to advance and position the packaging box being sealed by the apparatus.

In one aspect, the plurality of mechanical arms of the system may include at least one extending arm constructed and arranged to hold the packaging box on the conveyor belt. The plurality of mechanical arms may be supported by the housing of the plastic melting device, or an apparatus frame. In some embodiments the system includes a first extending arm configured to hold the packaging box on the conveyor belt. The first extending arm may be a left-side extending arm constructed and arranged to hold down the packaging box on the conveyor belt. The left-side extending arm may be mounted to and extend downwardly from the apparatus housing, and may be configured to retain the packaging box in place beneath the apparatus housing for application of the melted recycled plastic product thereto.

In another aspect, the plurality of mechanical arms may include a second extending arm that is a right-side extending arm constructed and arranged to retain and position the package on the conveyor belt. may be a right-side invertable and extendable arm mounted to and extending downwardly form the right side of the apparatus housing.

In a further aspect, the plurality of mechanical arms may include a third extending arm configured to support and position a plurality of rollers configured to contact and roll over a sealed portion of the packaging box to ensure the packaging box is sealed by the plastic.

In another aspect, a plurality of rollers may be supported by a roller arm. The roller arm may be mounted to a frame (not shown) or to the housing. The plurality of rollers is configured to contact and roll over a sealed portion of a packaging box conveyed by the conveyor belt thereunder to ensure the packaging box is sealed.

In one aspect, the apparatus may further comprise a cooling means to cool the plastic.

In another aspect, the cooling means may comprise an air machine capable of blowing extremely cold air to cool the plastic product after application thereof to the packaging box to seal the packaging box. The air machine may include an element configured to direct the air to the location of the packaging box.

In one aspect, the apparatus may further comprise an AC or DC power source operably connected to the plastic recycling apparatus, and the plastic melting device and the apparatus and device may be powered by the AC or DC power source.

In one aspect, the apparatus and its components may be battery-powered or may be powered by direct current. The apparatus may include a power cord and plug. The battery may be rechargeable, and may be configured to be recharged by the power cord and plug.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed to an environmentally friendly easy to use plastic recycling apparatus for melting and recycling plastic to provide a recycled plastic product which may be immediately used as a hot-melt adhesive. The apparatus may be provided as part of a packaging system configured to seal a packaging container such as a packaging box or a packaging crate, or any other suitable package assembly. The plastic recycling apparatus may be provided at any suitable location, nonlimiting examples of which may include residences, offices, and retail locations at which consumers may package items for shipping (office stores, shipping retail stores, post offices or the like). Consumers may bring their recyclable plastic to such retail locations, and use the recyclable plastic to seal packaging boxes.

Figure 1:
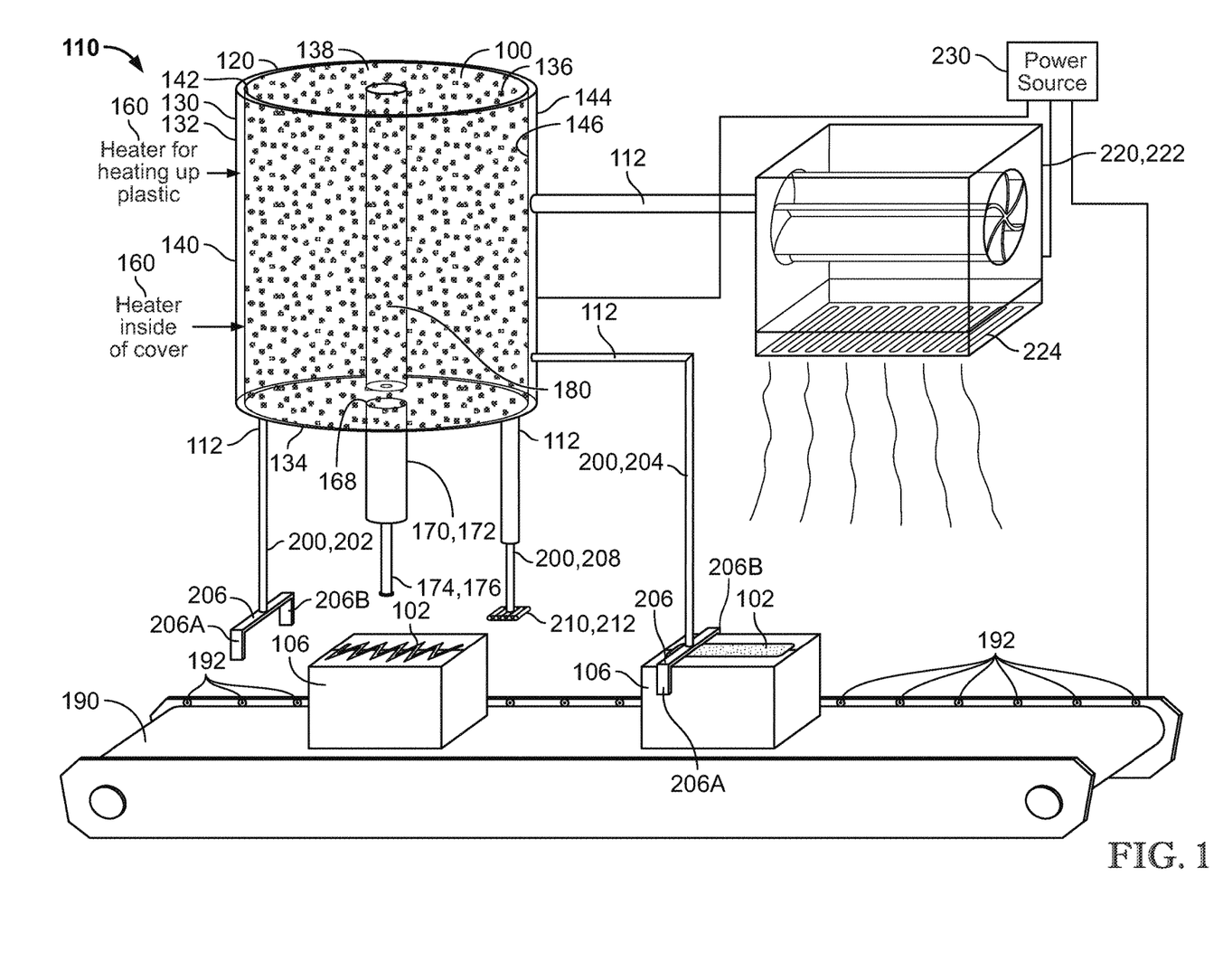
FIG. 1 presents an isometric view of a plastic recycling apparatus in accordance with a first illustrative embodiment of the present invention.
Figure 2:
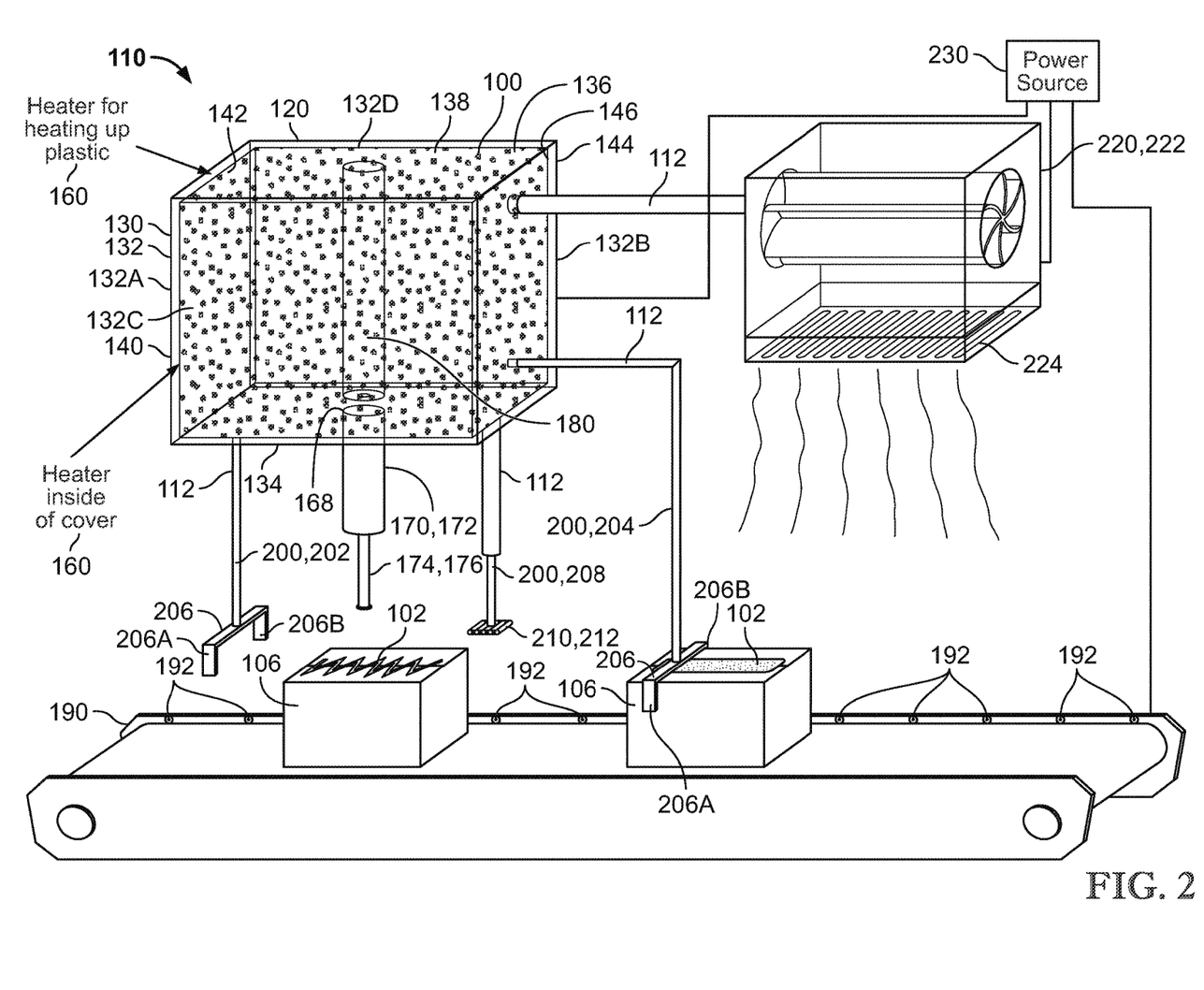
FIG. 2 presents an isometric view of a plastic recycling apparatus as in FIG. 1, showing the plastic melting device housing having an alternative shape.
Figure 3:
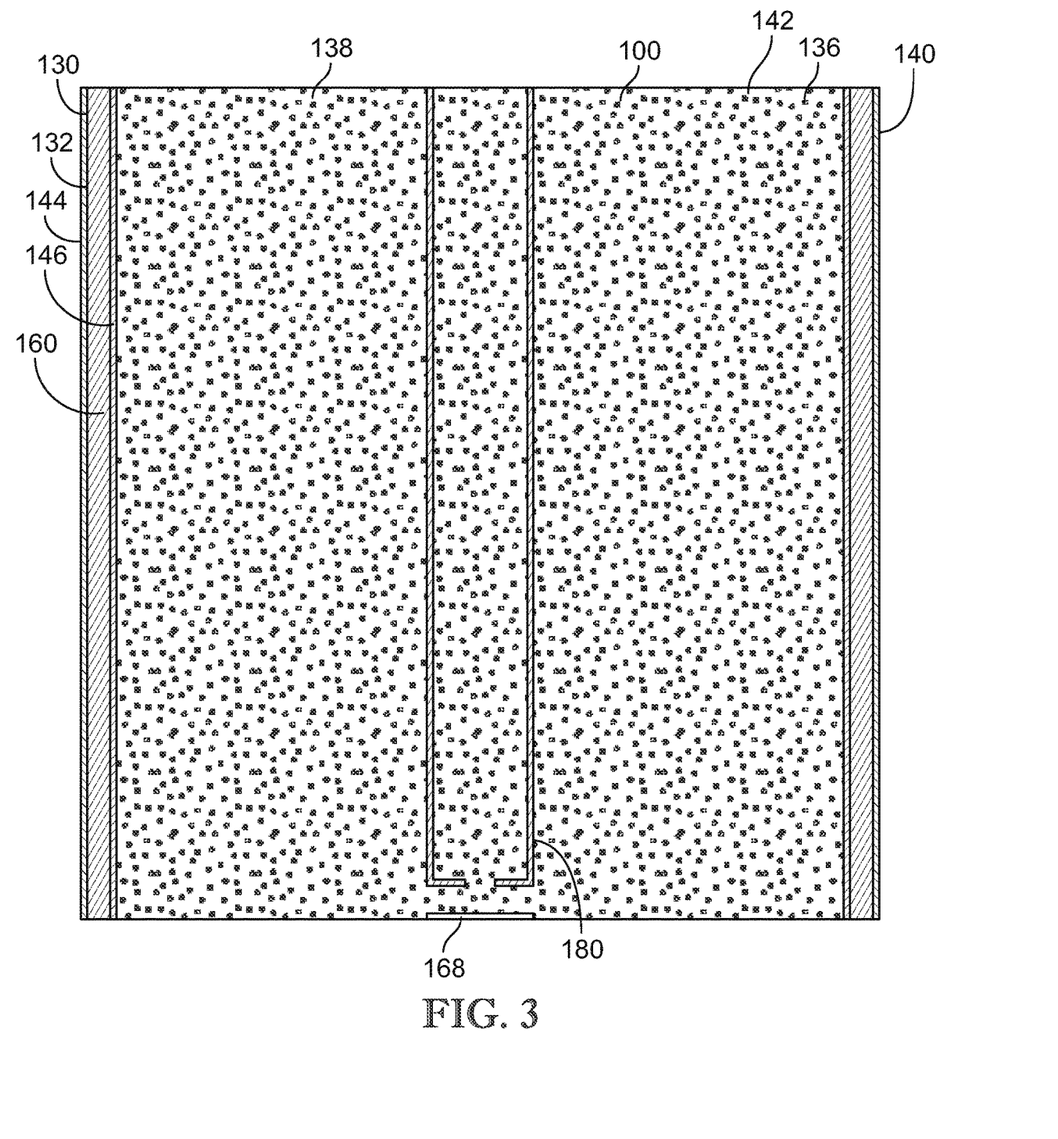
FIG. 3 presents a cross sectional view of the plastic melting device of the plastic recycling apparatus, enlarged to show further detail.

Referring initially to FIGS. 1-3, the plastic recycling apparatus 110 may provide a melting and recycling apparatus for melting and recycling plastic 100 to produce the recycled plastic product 102, namely a plastic adhesive. The recycled plastic product 102 may be immediately used to seal packaging containers or boxes 106.

The plastic recycling apparatus may comprise a plastic melting device 120 which comprises a stainless steel housing 130 configured to receive, heat, melt and mix a recyclable plastic material 100.

The plastic recycling apparatus 110 may comprise a support structure 112 capable of supporting the elements thereof. The components of the plastic recycling apparatus may be supported by an outer apparatus frame (not shown). The frame may be any suitable frame made of any suitable material.

The support structure 112 may be incorporated into the stainless steel housing 130 of the plastic melting device 120. The stainless steel housing 130 of the plastic melting device 120 may be constructed and arranged to provide a support structure 112 to support other elements or components of the plastic recycling apparatus 110.

The stainless steel housing 130 of the plastic melting device 120 may have any suitable shape, such as, for example without limitation, a cylindrical shape as shown at FIG. 1, or a square or cube shape as shown at FIG. 2.

The housing 130 may comprise at least one housing side 132, a housing base 134, and a housing interior portion 136 defined by the at least one side 132 and the housing base 134. The housing interior portion 136 or interior tank 136 is configured to receive the plastic material 100.

As shown at FIG. 1, the housing 130 may have a cylindrical shape, and the at least one housing side 132 may comprise a cylindrical housing side.

As shown at FIG. 2, the housing 130 may have a square or rectangular cube shape, and the at least one housing side may comprise a left housing side 132A, a right housing side 132B, a front housing side 132C, and a rear housing side 132D.

The stainless steel housing 130 of the plastic melting device 120 may have a housing exterior surface 140, a housing interior surface 142, a housing first outer wall 144, and a housing second inner wall 146. The housing 130 may further comprise at least one heating element 160 located in the housing 130. The at least one heating element 160 may be disposed between the housing first outer wall 144 and the housing second inner wall 146. The at least one heating element 160 may comprise a plurality of heating elements.

The housing exterior surface 140 may comprise exterior surfaces of the at least one housing side 132 and the housing base 134. The housing interior surface 142 may comprise interior surfaces of the at least one housing side 132 and the housing base 134. At least one heating element 160 may be disposed between the housing exterior surface 140 and the housing interior surface 142.

The housing 130 may further comprise an upper housing opening 138 defined by the at least one side 132, the upper housing opening being configured to receive a quantity of any suitable plastic material for melting by the at least one heating element 160 or plurality of heating elements 160.

The plastic melting device 120 of the apparatus 110 may further comprise a distribution port 170 in fluid communication with the interior tank 136 of the housing 130 of the plastic melting device 110. The distribution port 170 may extend downwardly from the housing lower opening 168 located at the housing base 134. The distribution port 170 is configured to convey the melted plastic material 102 from the housing 130 of the plastic melting device 120. The distribution port 170 may comprise an upper portion 172 connected to the housing 130, and a lower portion 174. The lower portion 174 of the distribution port 170 may comprise a delivery or application tube 176 for delivery of the melted plastic 102. The distribution port 170 may be selectively opened and closed by a removable stopper 180.

The melted recycled plastic 102 may be conveyed from the housing through the distribution port 170 and travel through the delivery tube 174 for application of the melted plastic to a packaging container or box 106 to be sealed. It can be seen at FIGS. 1 and 2, that the molten recycled plastic 102 may be applied to the exterior of the packaging container 106, for example, over the container box flaps of an exterior of the container box. In some embodiments, the molten recycled plastic 102 may be applied to the packaging container 106 beneath a container box flap to adhere the container box flaps down to close the container 106 with the molten plastic beneath the container box flaps.

The apparatus 110 may further comprise a conveyor belt 190 for supporting and conveying the packaging container or box 106 to be sealed, and a plurality of sensors 192 to monitor the location of the box 106 as it is conveyed through the apparatus 110.

In some embodiments, the conveyor belt may be bifurcated, and constructed and arranged to split into two directions for further handling of the package or box 106.

The apparatus 110 may further comprise a plurality of mechanical arms 200 configured to direct movement of elements of the apparatus 110, or the packaging box 106. The plurality of mechanical arms 200 may be configured to work in combination with the conveyor belt 190 to advance and position the packaging box 106 being sealed by the apparatus 110. A first mechanical arm 202 and a second mechanical arm 204 may comprise at least one lower extending arm 206 constructed and arranged to hold the packaging box on the conveyor belt. In some embodiments the mechanical arms 202, 204 may include a first lower extending arm 206A and a second lower extending arm 206B configured to hold the packaging box 106 on the conveyor belt. The first lower extending arm 206A may be a left-side lower extending arm and the second lower extending arm 206B may be a right-side lower extending arm which retains and guides the packaging box 106 on the conveyor belt 190. The first and second mechanical arms 202, 204 may be mounted to and extend downwardly from the housing 130, and may be configured and positioned to retain the packaging box 106 in place beneath the housing 130 for application of the melted recycled plastic 102 thereto. In some embodiments, the second extending arm 204 may comprise a right-side invertable and extendable arm mounted to and extending downwardly form a right side of the housing 130.

In some embodiments, the plurality of mechanical arms 200 may include a third mechanical arm 208 mounted to and extending downwardly from the housing 130. The third mechanical arm 208 is configured to support and position at least one roller 212 which may contact and roll over a sealed portion 108 of the packaging box to ensure the packaging box is sealed. The mechanical arm may comprise a pair of roller arms 210. The at least one roller may comprise a plurality of rollers 212 supported by the roller arms 210. It can be seen at FIGS. 1 and 2, that the molten recycled plastic 102 may be applied to the exterior of the packaging container 106, for example, over the box flaps of a box exterior of the box and the third mechanical arm may be rolled over the molten plastic located outside the container 106, to seal the container 106 with the molten plastic 102 outside of the container 106. In some embodiments, the molten recycled plastic 102 may be applied to the packaging container beneath a container box flap, for example, to adhere the container box flaps down to close the container with the molten plastic beneath the container box flaps, and the third mechanical arm 208 may be rolled over the exterior of the container to seal the container 106.

The apparatus 110 may further comprise a cooling means 220 to cool the recycled plastic 102 after application. In some embodiments, the cooling means 220 may comprise an air machine 222 capable of blowing extremely cold air to cool the plastic product 102 after application thereof to the packaging box to seal the packaging box. The air machine 222 may include an adjustable element or vent 224 configured to direct the air to the location of the packaging box 106.

The plastic recycling system 110 and the plastic melting apparatus 120 may comprise a power source 230 and the apparatus 120 and their components may be powered by a power source 230, which may be an AC or DC power source. The apparatus and its components may be battery-powered or may be powered by direct current and include a cord and plug. The battery may be rechargeable. The cord and plug may operate to power the system and apparatus, and may also operate to recharge the battery.

The plastic recycling apparatus of the present invention and the components thereof, may be made of any suitable materials, and fabricated by any suitable process. The plastic recycling apparatus and the components thereof may also have any suitable size and any suitable dimensions. The plastic recycling apparatus of the present invention may include any structural connection or fixation means which interconnect the components thereof. Nonlimiting examples of such structural connection or fixation means may include screws, bolts, clamps, adhesives, or the like. It can also be seen that some components may be integrally machined or integrally molded.

Alternative embodiments are contemplated in which a plurality of apparatuses is provided for use in a retail location, or wherein an apparatus comprises a plurality of plastic melting devices. Smaller scale apparatuses are also contemplated for home or office use.

In some embodiments the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

In summary, the present invention provides an apparatus for recycling plastic. The apparatus comprises a plastic melting device and delivery means for application of recycled melted plastic material to a packaging container or box to seal the container or box. The plastic melting device comprises a stainless steel housing configured to receive plastic material, at least one heating element disposed in the housing, and a distribution port configured to be selectively closed and opened. The apparatus further comprises a conveyor belt, sensors and a plurality of mechanical arms configured for directing the container or box through the apparatus. The container or box may be positioned by the conveyor belt and mechanical arms to receive a quantity of the melted plastic material from the distribution port, and for contact with rollers carried on a mechanical arm for closure of the container or box. The apparatus may further comprise a cooling means for cooling the recycled product after application to the container or box. The apparatus may be powered by an AC or DC power source.

The present invention provides a plastic recycling and packaging system for melting and recycling a quantity of plastic material to produce a molten plastic material for application to a packaging container to seal the packaging container. The plastic recycling apparatus and packaging system comprises a plastic melting device, a conveyor belt device, a plurality of sensors, a plurality of mechanical positioning arms, a mechanical roller arm, a cooling means, and a power source.

The plastic melting device may comprise:
a housing having a housing interior configured to receive the quantity of plastic material;
at least one heating element disposed in the housing, the at least one heating element being capable of melting the quantity of plastic material to provide a quantity of molten plastic material; and
a distribution port operably connected to a removable stopper, the distribution port in fluid communication with the housing interior, the distribution port being configured to be selectively opened and closed by removal and replacement of the removable stopper, the distribution port being further configured to permit a sufficient amount of molten plastic material to exit the housing through the distribution port in response to opening of the distribution port.

The conveyor belt device is configured for supporting and conveying a packaging container to be sealed.

The plurality of sensors is configured to monitor the location of the packaging container as the packaging container is conveyed through the apparatus on the conveyor belt.

The plurality of mechanical positioning arms is configured to stabilize or direct movement of the packaging container, and to work in combination with the conveyor belt to advance and position the packaging container being sealed by the apparatus. The plurality of mechanical positioning arms may further comprise a first mechanical positioning arm constructed and arranged to position the packaging container beneath the distribution port to permit application of the sufficient quantity of molten plastic material to the packaging container.

The mechanical roller arm is configured to support and position at least one roller constructed and arranged to contact and roll over a sealed portion of the packaging container to ensure the packaging container box is sealed by the sufficient quantity of molten plastic material applied thereto.

The cooling means may comprise an air machine capable of blowing extremely cold air on the packaging container to cool the sufficient quantity of molten plastic material present on the packaging container.

The power source is operably connected to the apparatus, and comprises one or more of a battery, a power cord with a plug, and combinations thereof.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A plastic recycling apparatus and packaging system for melting and recycling a quantity of plastic material to produce a molten plastic material for application to a packaging container to seal the packaging container, the plastic recycling apparatus and packaging system comprising:
   a plastic melting device comprising:
      a housing having a housing interior configured to receive the quantity of plastic material;
      at least one heating element disposed in the housing, the at least one heating element being capable of melting the quantity of plastic material to provide a quantity of molten plastic material; and
      a distribution port operably connected to a removable stopper, the distribution port in fluid communication with the housing interior, the distribution port being configured to be selectively opened and closed by removal and replacement of the removable stopper, the distribution port being further configured to permit a sufficient amount of molten plastic material, to seal a packaging container, to exit the housing through the distribution port in response to opening of the distribution port;

a conveyor belt configured for supporting and conveying the packaging container to be sealed;

a plurality of sensors configured to monitor the location of the packaging container as the packaging container is conveyed through the apparatus on the conveyor belt;

a plurality of mechanical positioning arms configured to stabilize or direct movement of the packaging container, and to work in combination with the conveyor belt to advance and position the packaging container being sealed by the apparatus, the plurality of mechanical positioning arms further comprising a first mechanical positioning arm constructed and arranged to position the packaging container beneath the distribution port to permit application of the sufficient quantity of molten plastic material from the distribution port to the packaging container to seal the packaging container;

a mechanical roller arm configured to support and position at least one roller constructed and arranged to contact and roll over a sealed portion of the packaging container to ensure the packaging container is sealed by the sufficient quantity of molten plastic material applied thereto to seal the packaging container;

a cooling means comprising an air machine capable of blowing cold air on the packaging container to cool the sufficient quantity of molten plastic material present on the packaging container to seal the packaging container; and a power source operably connected to the apparatus.

2. The plastic recycling apparatus and packaging system of claim 1, wherein the plastic material comprises recyclable plastic material.

3. The plastic recycling apparatus and packaging system of claim 2, wherein the housing comprises a stainless steel housing configured to receive, heat, melt and mix the recyclable plastic material.

4. The plastic recycling apparatus and packaging system of claim 3, wherein the stainless steel housing has a housing exterior surface, a housing first outer wall, a housing second inner wall, and a housing interior surface.

5. The plastic recycling apparatus and packaging system of claim 4, wherein the at least one heating element is disposed between the housing exterior surface and the housing interior surface.

6. The plastic recycling apparatus and packaging system of claim 5, wherein the at least one heating element is disposed in the housing between the housing first outer wall and the housing second inner wall.

7. The plastic recycling apparatus and packaging system of claim 6, wherein the at least one heating element comprises a plurality of heating elements.

8. The plastic recycling apparatus and packaging system of claim 6, wherein the housing comprises at least one housing side, a housing base, and the housing interior is defined by the at least one housing side and the housing base.

9. The plastic recycling apparatus and packaging system of claim 8, wherein the housing interior comprises an interior tank configured to receive the quantity of recyclable plastic material.

10. The plastic recycling apparatus and packaging system of claim 9, wherein the housing further comprises an upper housing opening defined by at least one side wall, configured to receive the quantity of recyclable plastic material for melting and recycling by the apparatus.

11. The plastic recycling apparatus and packaging system of claim 10, wherein the distribution port extends downwardly from the housing base for conveying the sufficient amount of molten plastic material to seal the packaging container in response to opening of the distribution port by removal of the removable stopper for application to the packaging container.

12. The plastic recycling apparatus and packaging system of claim 11, wherein the distribution port comprises a distribution port upper portion connected to the housing and a distribution port lower portion constructed and arranged for use in applying the sufficient amount of molten plastic material to the packaging container to seal the packaging container.

13. The plastic recycling apparatus and packaging system of claim 12, wherein the lower portion of the distribution port comprises a delivery tube for delivery of the sufficient amount of molten plastic material to seal the packaging container.

14. The plastic recycling apparatus and packaging system of claim 13, further comprising a support structure incorporating the housing.

15. The plastic recycling apparatus and packaging system of claim 14, wherein the housing is cylindrical and the at least one side wall comprises a cylindrical side.

16. The plastic recycling apparatus and packaging system of claim 15, wherein the housing interior surface comprises a cylindrical side interior surface and a housing base interior surface.

17. The plastic recycling apparatus and packaging system of claim 14, wherein the housing has a square or rectangular cube shape, and the at least one side wall comprises a left housing side, a right housing side, a front housing side, and a rear housing side.

18. The plastic recycling apparatus and packaging system of claim 17, wherein the housing interior surface comprises a left housing side interior surface, a right housing side interior surface, a front housing side interior surface, a rear housing side interior surface and a housing base interior surface.

19. The plastic recycling apparatus and packaging system of claim 1, wherein the power source comprises an AC power source or a DC power source.

20. The plastic recycling apparatus and packaging system of claim 19, wherein the AC power source further comprises a power cord with a plug.

21. The plastic recycling apparatus and packaging system of claim 18, wherein the power source comprises a battery power source.

22. The plastic recycling apparatus and packaging system of claim 21, wherein the battery power source comprises a rechargeable battery.

23. The plastic recycling apparatus and packaging system of claim 14, wherein the support structure incorporating the housing is configured to support the plurality of mechanical positioning arms.

24. The plastic recycling apparatus and packaging system of claim 23, wherein:
the first mechanical positioning arm further comprises a first left-side lower extending arm and a second right-side lower extending arm configured to hold, retain and guide the packaging container on the conveyor belt, and to position the packaging container beneath the distribution port to permit application of the sufficient quantity of molten plastic material from the distribution port to the packaging container to seal the packaging container; and the plurality of mechanical positioning arms further comprises a second mechanical positioning arm supported by the support structure to extend outwardly and downwardly from a right housing side, the second mechanical positioning arm further comprising a first left-side lower extending arm and a second right-side lower extending arm configured to hold, retain and guide the packaging container on the conveyor belt.

25. The plastic recycling apparatus and packaging system of claim 24, wherein the plurality of mechanical positioning arms further comprises a third extending arm.

26. The plastic recycling apparatus and packaging system of claim 25, wherein the third extending arm comprises the mechanical roller arm.

27. The plastic recycling apparatus and packaging system of claim 26, wherein the mechanical roller arm further comprises a plurality of rollers supported and positioned by the mechanical roller arm.

28. The plastic recycling apparatus and packaging system of claim 27, wherein the plurality of rollers are configured to contact and roll over a sealed portion of the packaging container to ensure the packaging container is sealed by the sufficient quantity of molten plastic material applied thereto to seal the packaging container.

29. The plastic recycling apparatus and packaging system of claim 1, wherein the cooling means further comprises an adjustable element configured to direct the air to the location of the packaging container.

30. The plastic recycling apparatus and packaging system of claim 29, wherein the adjustable element of the cooling means comprises a vent.

\* \* \* \* \*